US010673803B2

(12) United States Patent
Firat et al.

(10) Patent No.: US 10,673,803 B2
(45) Date of Patent: Jun. 2, 2020

(54) ANALYZING INTERESTS BASED ON SOCIAL MEDIA DATA

(71) Applicant: Crimson Hexagon, Inc., Boston, MA (US)

(72) Inventors: Aykut Firat, Cambridge, MA (US); Mitchell Brooks, Boston, MA (US); Christopher Bingham, Cambridge, MA (US); Francesco Liuzzi, Boston, MA (US)

(73) Assignee: Brandwatch, Boston, MA (US)

( * ) Notice: Subject to any disclaimer, the term of this patent is extended or adjusted under 35 U.S.C. 154(b) by 724 days.

(21) Appl. No.: 14/585,415

(22) Filed: Dec. 30, 2014

(65) Prior Publication Data

US 2016/0191447 A1 Jun. 30, 2016

(51) Int. Cl.
*H04L 12/58* (2006.01)
*G06Q 50/00* (2012.01)

(52) U.S. Cl.
CPC .............. *H04L 51/32* (2013.01); *G06Q 50/01* (2013.01)

(58) Field of Classification Search
CPC ...................................................... H04L 51/32
USPC ........................................................ 709/204
See application file for complete search history.

(56) References Cited

U.S. PATENT DOCUMENTS

| 2010/0185519 | A1* | 7/2010 | Ramaswamy | ......... G06Q 10/10 705/14.58 |
| 2011/0282732 | A1* | 11/2011 | Bax | ...................... G06Q 30/02 705/14.44 |
| 2013/0298038 | A1* | 11/2013 | Spivack | ............... H04L 65/403 715/753 |
| 2014/0222721 | A1* | 8/2014 | Stock | .................... G06Q 50/01 706/11 |

* cited by examiner

*Primary Examiner* — Sm A Rahman
*Assistant Examiner* — Emad Siddiqi
(74) *Attorney, Agent, or Firm* — Nutter McClennen & Fish LLP

(57) ABSTRACT

Systems and methods are provided for analyzing people's interests, based on signals available within social media. In general, the systems and methods can include determining interests for a group of people that differentiate the group from another group. First, topics of interest for each individual can be calculated based on topics associated with their activity on social media websites and topics associated with people in their social media network. The interest topics of people in a first group can be compared to the interest topics of people in a second group to determine which interest topics have a high affinity for one group but not the other. The invention can further provide for visualization of the topic distribution between the two groups, which can include illustrations of the number of people in each group who are interested in a plurality of topics and/or the prevalence of each of the plurality of topics in the first group relative to the second group.

6 Claims, 11 Drawing Sheets

ANALYZING INTERESTS BASED ON SOCIAL MEDIA DATA

FIELD

This invention relates to the field of data mining systems. Exemplary embodiments relate to analyzing information communicated through social media platforms to assess and visualize the interests of people who use social media platforms.

BACKGROUND

Social networking has become a worldwide phenomenon and importance of social media is steadily and rapidly increasing. Millions of people communicate, share ideas, discuss news, current events, products, services and various other topics through different social media platforms. A social media platform, or service, enables a user to generate a piece of information, often referred to as a post, which can then be displayed on the social media web site where it can be viewed by other users. A post can include text, pictures, video or other information. Users can comment on the posts that they viewed, share it with their connections, or otherwise react to information in the post. Many users utilize social media services often—daily or even multiple times a day—and various themes can quickly become topics of active discussion as information spreads via a social network.

A wealth of information generated through social media platforms can be used for a variety of purposes. For example, market researchers can monitor social networking sites in an attempt to identify users' views on various products, services and other topics. However, it may be challenging to extract meaningful information from the large volume of social networking posts. The analysis can be further complicated by a lack of information about the people who are doing the posting. Thus, given the volume and complexity of social networking information, obtaining useful knowledge from it can be a daunting task.

SUMMARY

Systems and methods of the present invention can help users discover the interests of people who are active on social media platforms.

In one aspect, a computer-implemented method is provided for operating at least one computer processor to analyze information communicated through social media platforms. For each of a plurality of people, the method can include determining topics of interest to the person. Determining the topics of interest can include accessing a data store storing a list of content topics associated with each of the plurality of people and an influencer graph connecting the plurality of people based on influence, assigning a first weight to content topics associated with the person in the data store, assigning a second weight to content topics associated with other people who influence the person, assigning a third weight to content topics associated with other people who are influenced by the person, and combining weightings for the content topics to create and store a list of interest topics for the person. In some embodiments, the determining of topics of interest can also include selecting interest topics having a weight above a threshold value and storing only the selected interest topics.

The method can further include defining groups based on authorship of data items communicated through social medial platforms. For example, the method can include obtaining a first plurality of data items communicated through at least one social media platform related to a first criterion and obtaining a second plurality of data items communicated through at least one social media platform related to a second criterion. The data items in the first plurality and the second plurality can each be authored by one of the plurality of people. The interest topics of people who are authors of data items in the first plurality of data items can be compared to the interest topics of the people who are authors of the data items in the second plurality of data items to determine interest topics that are substantially not in common as between the authors of the data items in the first plurality of data items and the authors of the data items in the second plurality of data items. A representation of the first criterion, the second criterion, and a representation of the interest topics that are substantially not in common can be displayed on a computer display.

The representation can take a variety of forms. In one embodiment, the representation can include a graph having a plurality of bubbles, each of the bubbles representing an interest topic that is substantially not in common as between the authors of the data items in the first plurality of data items and the authors of the data items in the second plurality of data items. A size of each of the bubbles can reflect a number of people interested in the interest topic to which the bubble corresponds, and/or a location of each of the bubbles along an axis of the representation can reflect a relative prevalence of the interest topic to which the bubble corresponds among authors of the data items in the first plurality of data items compared to the authors of the data items in the second plurality of data items.

In another aspect, a method is provided for operating at least one computer processor to analyze information communicated through social media platforms. The at least one computer processor can determine interest topics for each of a plurality of people based on their use of the social media platforms and can store the interest topics in a data store. The at least one computer processor can obtain interest topics from the data store for first and second groups of people, and can compare the interest topics of people in the first group with the interest topics of people in the second group to determine interest topics that are substantially not in common as between the people in the first and second groups. The method can further include displaying on a computer display a representation of the interest topics that are substantially not in common.

The groups can be defined various ways, for example the first group can include people who are associated with a first interest topic and the second group can include people who are associated with a second interest topic. In other embodiments, the first group can include authors of a first plurality of data items communicated through at least one social media platform that are related to a first criterion and the second group can include authors of a second plurality of data items communicated through at least one social media platform that are related to a second criterion.

In some embodiments, the interest topics for each of the plurality of people can be determined based on topics in which each person influences other people on social media platforms. In still further embodiments, the determining of interest topics by the at least one computer processor can also include selecting interest topics having weighted incidences among each person's social network that are above a threshold value.

In yet another aspect, a memory storing computer-executable instructions is provided, along with at least one processor communicatively coupled to the memory and configured to execute the computer-executable instructions to perform a method of analyzing information communicated through social media platforms. The method can include determining interest topics for each of a plurality of people based on their use of the social media platforms and can store the interest topics in a data store. The at least one computer processor can obtain interest topics from the data store for first and second groups of people, and can compare the interest topics of people in the first group with the interest topics of people in the second group to determine interest topics that are substantially not in common as between the people in the first and second groups. The method can further include displaying on a computer display a representation of the interest topics that are substantially not in common.

As in the previous embodiment, the first group can include authors of a first plurality of data items communicated through at least one social media platform that are related to a first criterion and the second group can include authors of a second plurality of data items communicated through at least one social media platform that are related to a second criterion. In still further embodiments, the interest topics for each of the plurality of people can be determined based on topics in which each person creates content on social media platforms.

The representation of the interest topics that are substantially not in common can take a variety of forms. In one embodiment, the representation can include a graph having a plurality of bubbles, each of the bubbles representing an interest topic that is substantially not in common as between the first and second groups. A size of each of the bubbles can reflect a number of people interested in the interest topic to which the bubble corresponds, and/or a location of each of the bubbles along an axis of the representation can reflect a relative prevalence of the interest topic to which the bubble corresponds in the first group versus the second group.

In another aspect, a method is provided for operating at least one computer processor to analyze information communicated through social media platforms. The method can include determining, by the at least one computer processor, interest topics for each of a plurality of people based on their use of the social media platforms and storing the interest topics in a data store. The at least one computer processor can obtain social media content created by a group of people who share a common interest topic, and can identify examples of social media content that have a high affinity for the group as opposed to a general population. The method can further include displaying on a computer display the examples of social media content.

Further methods, systems, and computer readable media having computer instructions thereon are provided.

DETAILED DESCRIPTION OF THE INVENTION

Systems and methods are provided for analyzing people's interests, based on signals available within social media. In general, the systems and methods can include determining interests for a group of people that differentiate the group from another group and/or from the general population. First, topics of interest for each individual can be calculated based on topics associated with their activity on social media websites and topics associated with people in their social media network. An end user can define two groups of people whose interests they would like to compare, for example a first group can be defined as all people who create social media content related to a first user-specified criterion and a second group can be defined as all people who create social media content related to a second user-specified criterion. The interest topics of people in the first group can be compared to the interest topics of people in the second group to determine which interest topics have a high affinity for one group but not the other. The invention can further provide for visualization of the topic distribution between the two groups, which can include illustrations of the number of people in each group who are interested in a plurality of topics and/or the prevalence of each of the plurality of topics in the first group relative to the second group.

Certain exemplary embodiments will now be described to provide an overall understanding of the principles of the structure, function, manufacture, and use of the methods, systems, and devices disclosed herein. One or more examples of these embodiments are illustrated in the accompanying drawings. Those skilled in the art will understand that the methods, systems, and devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Computer Processor

Figure 1:
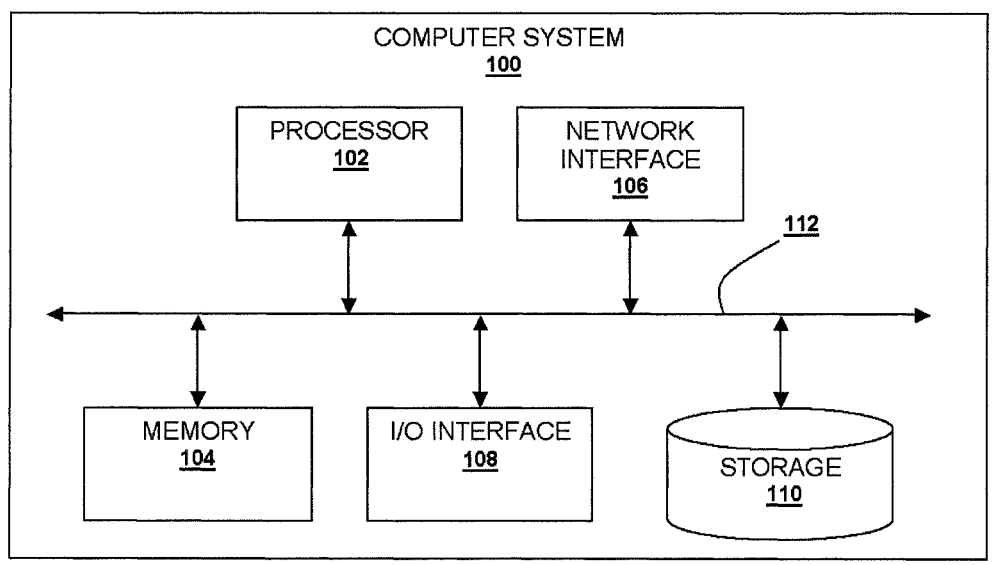
FIG. 1 is a schematic diagram of one exemplary embodiment of a computer system useful with the invention.

The systems and methods disclosed herein can be implemented using one or more computer systems, such as the exemplary embodiment of a computer system 100 shown in FIG. 1. As shown, the computer system 100 can include one or more processors 102 which can control the operation of the computer system 100. The processor(s) 102 can include any type of microprocessor or central processing unit (CPU), including programmable general-purpose or special-purpose microprocessors and/or any one of a variety of proprietary or commercially available single or multi-processor systems. The computer system 100 can also include one or more memories 104, which can provide temporary storage for code to be executed by the processor(s) 102 or for data acquired from one or more users, storage devices, and/or databases. The memory 104 can include read-only memory (ROM), flash memory, one or more varieties of random access memory (RAM) (e.g., static RAM (SRAM), dynamic RAM (DRAM), or synchronous DRAM (SDRAM)), and/or a combination of memory technologies.

The various elements of the computer system 100 can be coupled to a bus system 112. The illustrated bus system 112 is an abstraction that represents any one or more separate physical busses, communication lines/interfaces, and/or multi-drop or point-to-point connections, connected by appropriate bridges, adapters, and/or controllers. The computer system 100 can also include one or more network interface(s) 106, one or more input/output (TO) interface(s) 108, and one or more storage device(s) 110.

The network interface(s) 106 can enable the computer system 100 to communicate with remote devices (e.g., other computer systems) over a network, and can be, for example, remote desktop connection interfaces, Ethernet adapters, and/or other local area network (LAN) adapters. The IO interface(s) 108 can include one or more interface components to connect the computer system 100 with other electronic equipment. For example, the IO interface(s) 108 can include high speed data ports, such as USB ports, 1394 ports, etc. Additionally, the computer system 100 can be accessible to a human user, and thus the IO interface(s) 108 can include displays, speakers, keyboards, pointing devices, and/or various other video, audio, or alphanumeric interfaces. The storage device(s) 110 can include any conventional medium for storing data in a non-volatile and/or non-transient manner. The storage device(s) 110 can thus hold data and/or instructions in a persistent state (i.e., the value is retained despite interruption of power to the computer system 100). The storage device(s) 110 can include one or more hard disk drives, flash drives, USB drives, optical drives, various media cards, and/or any combination thereof and can be directly connected to the computer system 100 or remotely connected thereto, such as over a network. The elements illustrated in FIG. 1 can be some or all of the elements of a single physical machine. In addition, not all of the illustrated elements need to be located on or in the same physical or logical machine. Rather, the illustrated elements can be distributed in nature, e.g., using a server farm or cloud-based technology. Exemplary computer systems include conventional desktop computers, workstations, minicomputers, laptop computers, tablet computers, PDAs, mobile phones, and the like.

Although an exemplary computer system is depicted and described herein, it will be appreciated that this is for sake of generality and convenience. In other embodiments, the computer system may differ in architecture and operation from that shown and described here.

Modules

The various functions performed by the computer system 100 can be logically described as being performed by one or more modules. It will be appreciated that such modules can be implemented in hardware, software, or a combination thereof. It will further be appreciated that, when implemented in software, modules can be part of a single program or one or more separate programs, and can be implemented in a variety of contexts (e.g., as part of an operating system, a device driver, a standalone application, and/or combinations thereof). In addition, software embodying one or more modules is not a signal and can be stored as an executable program on one or more non-transitory computer-readable storage mediums. Functions disclosed herein as being performed by a particular module can also be performed by any other module or combination of modules.

Exemplary Architecture

Figure 2:
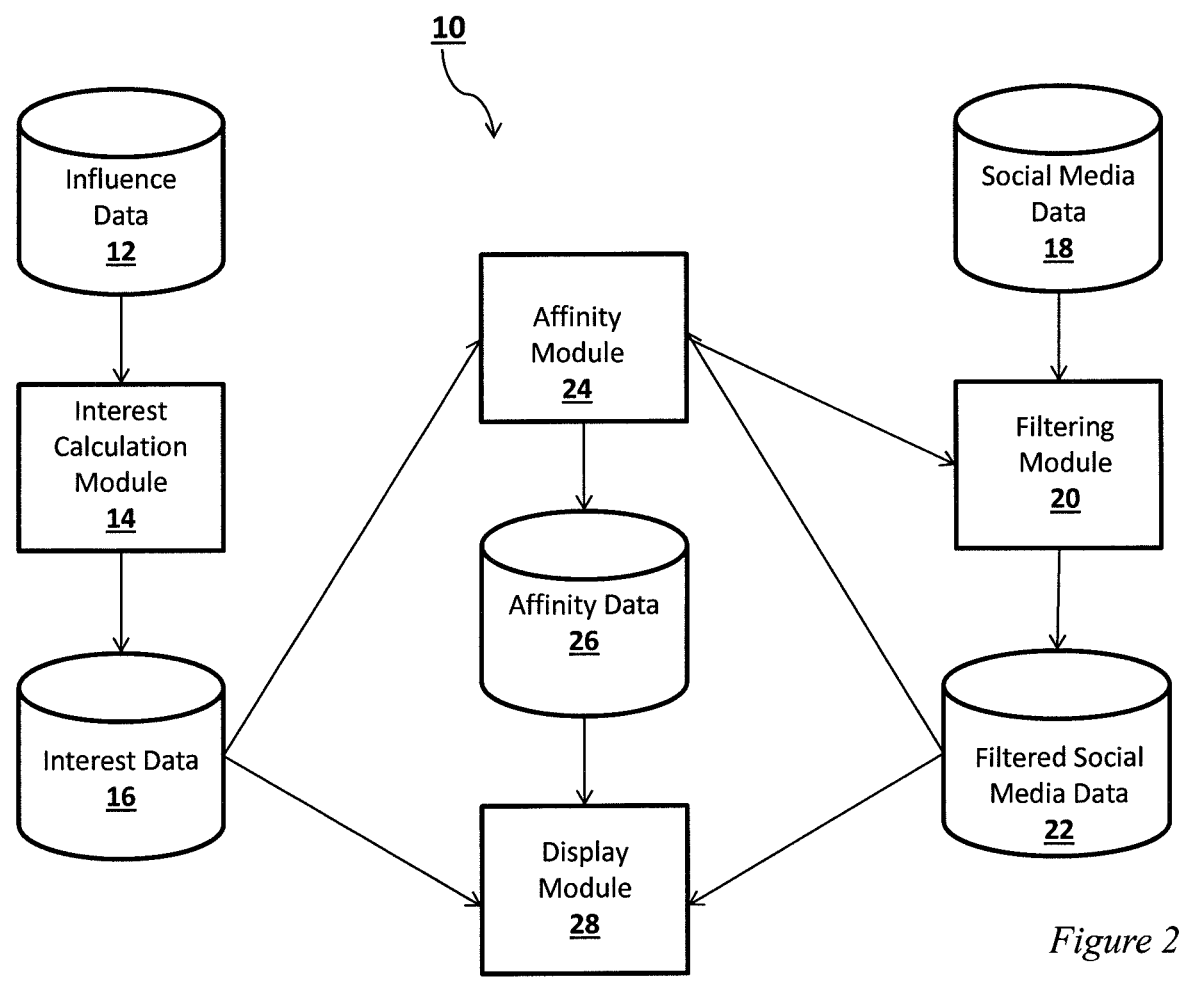
FIG. 2 is a schematic diagram of one exemplary embodiment of an interest analysis system.

An exemplary system 10 for determining interests that have a high affinity for a group of people, based on social media data, is disclosed in FIG. 2 and can operate as follows: an interest calculation module 14 can determine, for each of a plurality of individuals, a list of topics in which those individuals are interested ("interest topics") and store the interest topics in a data store. The calculation can be based on signals available on social media platforms, for example based on topics in which an individual creates content and topics in which others in the individual's social network create content.

An end user can define at least one group of people whose interests they would like to analyze by specifying one or more criteria that each member of the group must have in common, e.g., creation of social media data relating to a topic, interest in a given interest topic, gender, activity on a particular social media platform, location, etc. Where the group definition is based on authorship of social media data that meets the one or more criteria, a filtering module 20 filters social media data 18 for content that meets the one or more criteria. Authors of the social media data 18 that meet the one or more criteria are considered to be members of the group.

Given the at least one group and a list of interest topics for each member of the group, an affinity module 24 can determine which interest topics have a high affinity for that group as compared to a general population or a second group. In some embodiments, where the at least one group is defined by common interest in a topic, the affinity module 24 can identify specific examples of social media content having a high affinity for the group as compared to a general population or a second group, e.g., pictures that are often shared among members of the group. This method is superior to simply computing the most common features of a group, as those features are likely to be related to banal interests like "music" and "sports." More distinctive and useful are the smaller topics or social media content that are much more prevalent in one group vs. the other (even if they are still fairly rare in absolute terms), as identified by this method.

The system can also include a display module 28 for visualizing affinity data 26 calculated by the affinity module 24. In particular, the display module 28 can be configured to display the relative prevalence of each interest topic as between two different groups and/or social media content that has a high affinity for a group sharing a common interest.

The system 10 can include fewer or more modules than what is shown and described herein and can be implemented using one or more digital data processing systems of the type described above. The system 10 can be implemented on a single computer system, or can be distributed across a plurality of computer systems, e.g., across a "cloud." The system 10 also includes a plurality of databases, which can be stored on and accessed by computer systems. It will be appreciated that any of the modules or databases disclosed herein can be subdivided or can be combined with other modules or databases.

Methods performed by each of the modules are described in detail below. The methods can be implemented on a computer as described above, preferably by programming the computer to perform the described steps.

Interest Calculation Module

Figure 3:
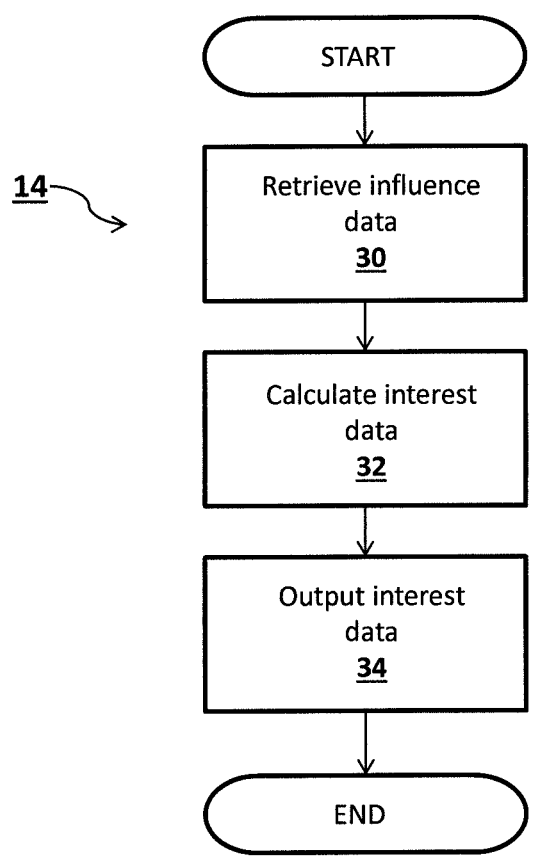
FIG. 3 is a flow chart that schematically depicts an exemplary method of an interest calculation module for use with the interest analysis system of FIG. 2.

An exemplary method carried out by the interest calculation module 14 is illustrated in FIG. 3. For each person among a plurality of people 38, the interest calculation module 14 produces a list of that person's interests and stores the lists in a data store as interest data 16. The interest data 16 can be derived from a number of signals available in social media, for example based on social media content that an individual has created, social media content created by other individuals in that individual's network, probabilistic assumptions about an individual's interests based on demographic information, etc.

In the exemplary embodiment, the interest calculation is based on influence data 12, which can include a list of content topics for each of the plurality of people 38, as well as connectivity data indicating which people influence each other. The content topics can be determined based each person's activity on social media websites, for example based on social media content that a person has created, social media content that the person has "shared," commented on, or "re-tweeted," etc. However, topics on which an individual creates content may not correspond to topics in which that individual is interested. Some users of social media platforms do not generate content about topics they are interested in, and/or may create content that on topics they don't care about. Therefore, to come up with a more accurate measure of a person's interests, the interest calculation module 14 assumes that each person's real interest topics are based on some combination of the person's content topics, the content topics of people who influence the person, and the content topics of people who are influenced by the person. The contribution of all of the content topics to the person's actual interests are weighted according to the likelihood that those topics are actually of interest to the person.

Figure 4:
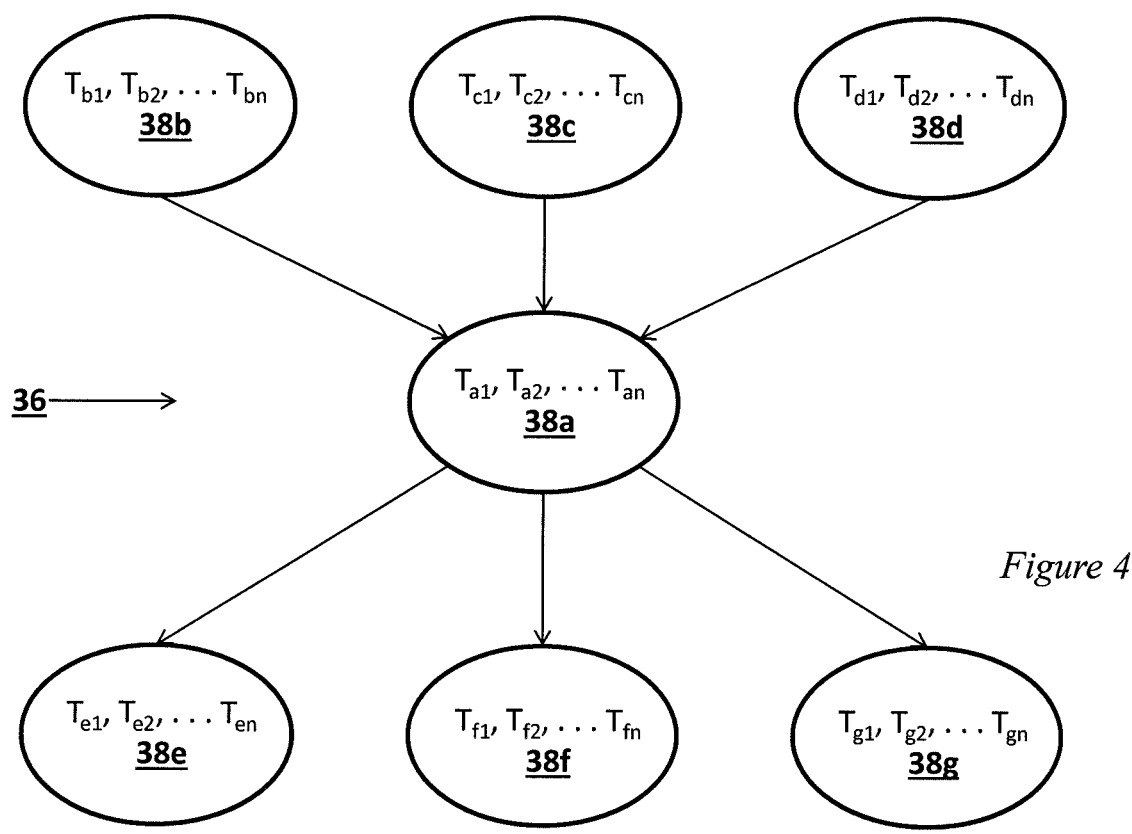
FIG. 4 is a schematic diagram illustrating an influence graph generated based on social media data.

A first step of the exemplary method performed by the interest calculation module 14 is to retrieve the influence data 12 from a data store (step 30). In some embodiments, the influence data 12 can be structured as an influence graph 36 in which each person represents a node and the nodes are directionally connected according to influence. An exemplary portion of an influence graph 36 which is centered around a target person 38a is illustrated in FIG. 4. As shown, the target person 38a influences three other people 38e, 38f, and 38g and is associated with n content topics $T_{a1}, T_{a2}, \ldots T_{an}$. Each of the influenced people 38e, 38f, and 38g also are associated with n content topics. In turn, the target person 38a is influenced by three other people ("influencers") 38b, 38c, and 38d, each of whom are associated with n content topics.

The interest calculation module 14 can calculate the interest data 16 based on the influence graph 36 by first assigning weights to the content topics of each person in the target person's network. For example, a first weight W1 can be assigned to the content topics of the target person 38a him or herself, a second weight W2 can be assigned to the content topics of the target person's influencers 38b, 38c, and 38d, and a third weight W3 can be assigned to the content topics of the people that the target person influences 38e, 38f, and 38g. In general, W1 will be greater than W2, which will be greater than W3. Although the weights W2 and W3 are the same for all of the target person's influencers 38b, 38c, and 38d and people that the target person influences 38e, 38f, and 38g, respectively, they can be varied based upon a likelihood that a particular person influences or is influenced by the target person 38a.

The interest calculation module 14 can tally the content topics of the target person 38a, the target person's influencers 38b, 38c, and 38d, and the people that the target person influences 38e, 38f, and 38g according to their respective weights. For example, where a content topic $T_x$ is associated with the target person 38a and with the influencer 38b, W1 is 1.0, and W2 is 0.5, the tally for the topic $T_x$ will be 1.5. Using this method, the tally per topic is a reflection of the likelihood that the target person 38a is actually interested in that topic. The interest calculation module 14 can store the tallied topics as weighted interest topics $I_{a1}, I_{a2}, \ldots I_{am}$ in a data store in association with the target person 38a. The process can be repeated for each of the plurality of individuals 38.

By thus moderating the weight given to each person's content topics with the content topics of other people in the target person's network, the method can help to eliminate "false positive" interests, e.g., topics in which the person has created content but is not interested. The method can also capture the interests of a person who never generates content about a particular topic, but frequently responds when other people post about that topic.

To further help eliminate spurious data, in some embodiments calculating each person's weighted interest topics (step 32) can include filtering out interest topics with low weighted tallies. Each weighted interest topic with a tally below a specified threshold value can be discarded, and only topics with tallies above the threshold will be stored in the data store as weighted interest topics.

Filtering Module

Figure 5:
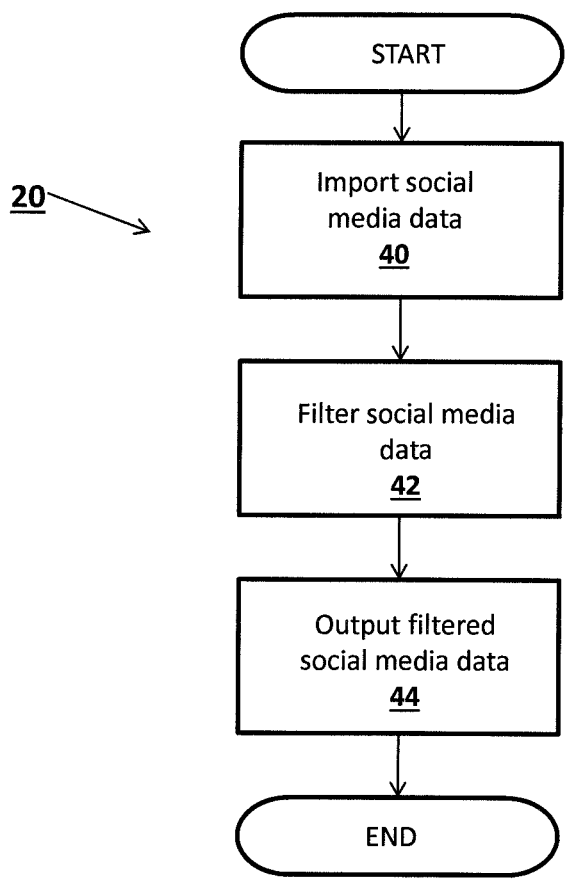
FIG. 5 is a flow chart that schematically depicts an exemplary method of a filtering module for use with the interest analysis system of FIG. 2.

The filtering module 20 can determine the composition of groups for interest affinity analysis based on characteristics of social media data 18 created by members of the groups. An exemplary method performed by the filtering module 20 is illustrated in FIG. 5. The method beings by importing social media data 18 communicated through at least one social media platform over a time interval (step 40). The social media data 18 can include social media content, e.g., content from TWITTER, blogs, news, and/or other content. Individual content items are sometimes referred to herein as "documents" or "posts." In general, these posts are text inputs—that is, they include unstructured data. However, the invention can be applied just as well to structured data, such as data stored in spreadsheets or databases in a structured format, or to combinations of structured and unstructured data. Each document is associated with a time value and with an author. In some embodiments, the documents are also associated with additional identifying characteristics such as location, language, and source. Each of these characteristics can be stored along with the documents as metadata.

The next step is to filter the social media data 18 based on one or more criteria that define a group (step 42). For example, to filter all documents relating to a topic selected by the user, the filtering module can be configured to search on keywords or word stems in the manner of known search engines that can perform content searching on on-line or private documents. The filtering module can also allow users to select from available social media platforms so that the user may analyze, for example, only TWEETS. The filtering module can further allow the user to specify an author, a time, or date range for the documents. The filtering module can still further allow the user to specify a preferred language or languages for the documents. The filtering module may further allow specification of any other data or metadata associated with the documents. The filtering module 20 can store the at least two subsets of documents, along with their associated authors, as filtered social media data 22 (step 44).

Affinity Module

Figure 6:
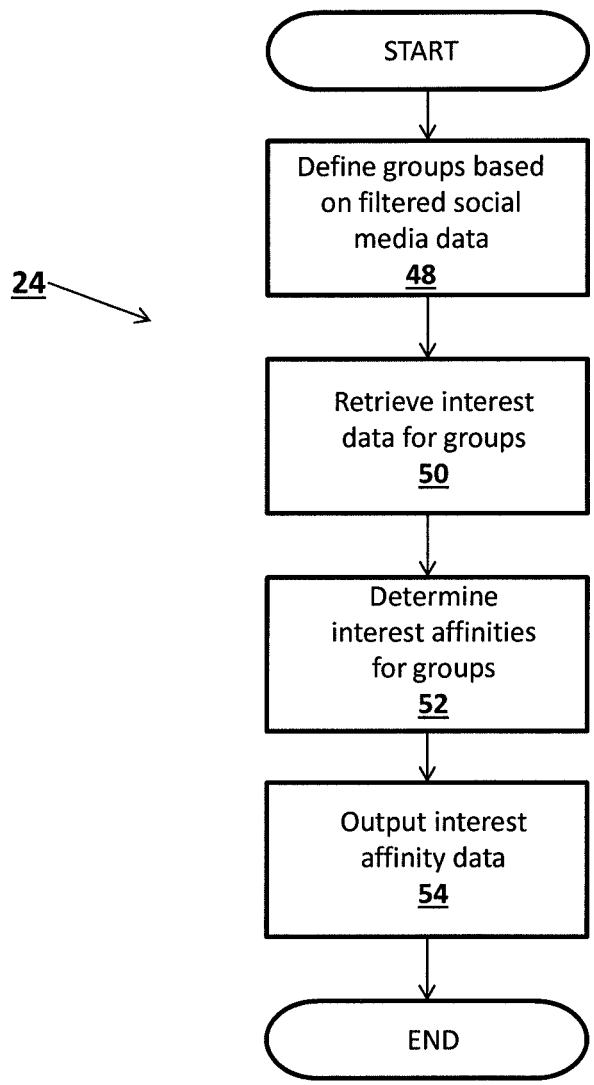
FIG. 6 is a flow chart that schematically depicts an exemplary method of an affinity module for use with the interest analysis system of FIG. 2.

The purpose of the affinity module 24 is to determine characteristics of a group of people that makes that group distinctive, either from another group or from a general population. In one exemplary embodiment, the affinity module 24 can take a list of weighted interest topics $I_1, I_2, \ldots I_m$ that were calculated by the interest calculation module 14 for each of a plurality of individuals in at least two groups and can calculate interest affinity data 26i that represents the relative prevalence of interest topics as between people in the at least two groups. This exemplary method is illustrated in FIG. 6.

The exemplary method performed by the affinity module 24 begins with defining at least two groups (step 48). In general, the one or more criteria for the at least two groups are input by a user. However, in some embodiments the affinity module 24 can define at least one of the groups automatically based on pre-defined criteria stored in a memory of the affinity module 24. For example, where a user defines only one group, the affinity module 24 can automatically define a second group as a general population group, e.g., all people who use TWITTER.

The affinity module 24 can then query the filtering module 20 to determine compositions of the at least two groups. In particular, where a group is defined according to authorship of social media data 18 that meets one or more criteria, the affinity module 24 can query the filtering module 20 for social media data 18 that meets the one or more criteria. The resulting filtered social media data 22, along with associated authors, is output to the affinity module 24. The authors of the filtered social media data 22 that meets the one or more criteria are considered to constitute the group. For example, where the user indicates that a first group $G_1$ is to consist of everyone who has created social media content related to a given topic, the affinity module 24 can populate the first group $G_1$ with all individuals who have created content relating to the given topic, as determined by the filtering module 20. The affinity module 24 can be configured to only count each person only once for each group, even if that person has created more than one document that meets a criterion defining that group. Also, in some embodiments, where a person meets criteria specified for more than one group, that person may not be considered to be a part of either group.

Once the at least two groups have been defined, the affinity module 24 can retrieve a list of interest topics for each person in the at least two groups (step 50) from the data store that stores the interest data 16. The affinity module 24 then compares the interests of the at least two groups to determine how interest topics are distributed across the groups (step 52). This can be done in various ways, for example by tallying the instance of each interest topic in both groups and then, for each interest topic, calculating ratios of people in the first group $G_1$ to people in the second group $G_2$. The ratios represent the relative prevalence of an interest topic in one group versus the other. Thus, in addition to computing the most common interests for a group, the present method allows for calculation of interests that cause one group to stand out from another group.

In some embodiments, the determination of interest affinities can further include defining relevant interest topics, i.e., those interest topics that have a significantly greater incidence in one group versus the other. For example, the affinity module 24 can define relevant interest topics as those having a ratio of people in the first group $G_1$ to people in the second group $G_2$ that is above or below predefined threshold values. It will be appreciated that other measures can indicate the relative prevalence of an interest topic, e.g., a percentage, and that those measures can be similarly compared to one or more threshold values to select relevant interest topics.

The resulting interest affinity data 26i output by the affinity module 24 can thus include the relevant interest topics, their relative prevalence in the at least two groups, and the total number of people in each group who are interested in those topics. The affinity module 24 can output the interest affinity data 26i, for example to a data store (step 54).

Figure 7:
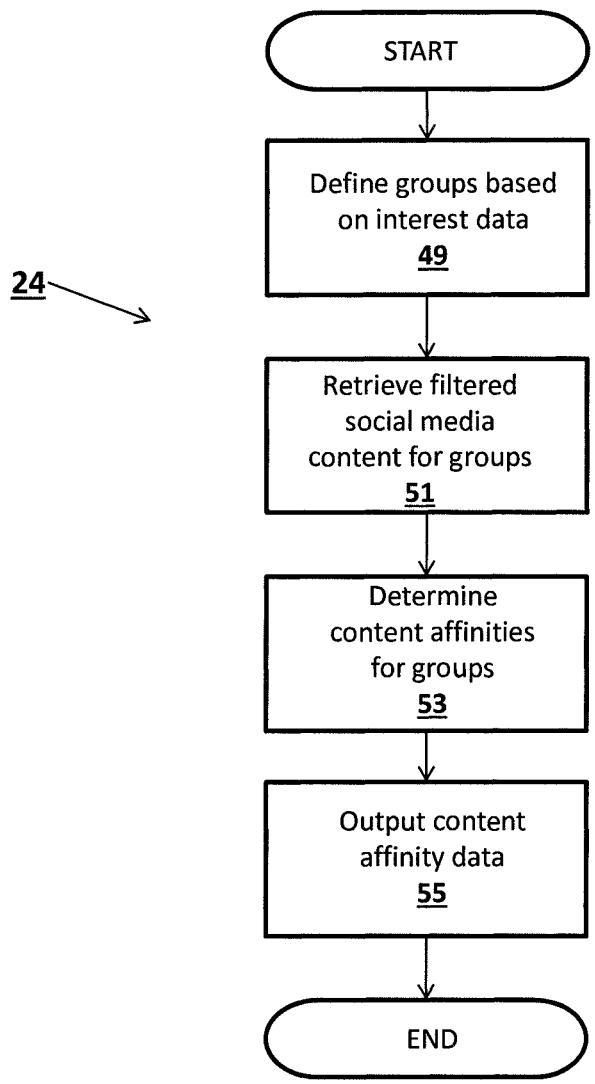
FIG. 7 is a flow chart that schematically depicts a second exemplary method of an FIG. 8 is a diagram of an exemplary display output from the systems and methods of the invention.

A second exemplary method that can be performed by the affinity module 24 is illustrated in FIG. 7. In this embodiment, the affinity module 24 defines at least one group according to common interest and then identifies particular examples of social media content that are prevalent in the at least one group, as compared to another group or a general population. The second exemplary method beings with defining groups based on the interest data 16 (step 49). In general, a user can specify an interest topic that defines the first group $G_1$, and the affinity module 24 can automatically define the second group $G_2$ as a general population group, e.g., all users of TWITTER. It will be appreciated, however, that the groups $G_1, G_2$ can be defined in any way, either manually by a user or automatically by the affinity module 24. The affinity module 24 can then access the interest data 16 from the data store and populate the first group $G_1$ with all people who are interested in the user-specified topic. For example, where the user indicates that the first group $G_1$ is to consist of everyone who is interested in the topic $I_y$, the affinity module 24 can populate the first group $G_1$ with all individuals who are associated with the interest topic $I_y$, as determined by the interest calculation module 14.

Given the composition of the at least two groups, the affinity module 24 can retrieve filtered social media data 22 from the filtering module 20 to thereby identify social media content that is popular among the group of people who share a common interest topic (step 51). The social media content can include posts, hashtags, pictures, etc. that are frequently used and/or shared by members of the group as compared to another group of a general population. The filtered social media data 22 that is retrieved can include content created by each person in the at least two groups, as well as information about content sharing by members of the at least two groups, e.g., the number of times a given document or post was "shared," "liked," and/or "re-tweeted."

Then, the affinity module 24 can identify particular examples of content that are prevalent in each group using methods similar to those described above for interest comparison (step 53). In some embodiments, the affinity analysis at step 53 is performed only for a particular type of social media content, e.g., a hashtag, a picture, a "tweet," etc. In this way, the affinity module 24 can pick out examples of social media content that have a disproportionately high prevalence in a group—regardless of whether the content relates to the interest shared by all individuals within the group.

The resulting content affinity data 26c output by the affinity module 24 can thus include, e.g., the exemplary social media content with a high affinity for at least one of the at least two groups, the relative prevalence of the exemplary social media content in the at least one group as compared to another group, and the total number of people in the at least one group who have generated and/or "shared"

the exemplary social media content. The affinity module 24 can output the content affinity data 26c, for example to a data store (step 55).

Display Module

In general, the display module 28 can display information about the interests of groups of people that make those groups distinctive. This can include information retrieved and/or derived from the affinity data 26, the interest data 16, and/or the filtered social media data 22. It will be appreciated by a person skilled in the art that the exemplary illustrations and measures provided herein are merely examples of information that can be displayed by the display module 28 and are not intended to be limiting.

Figure 8:
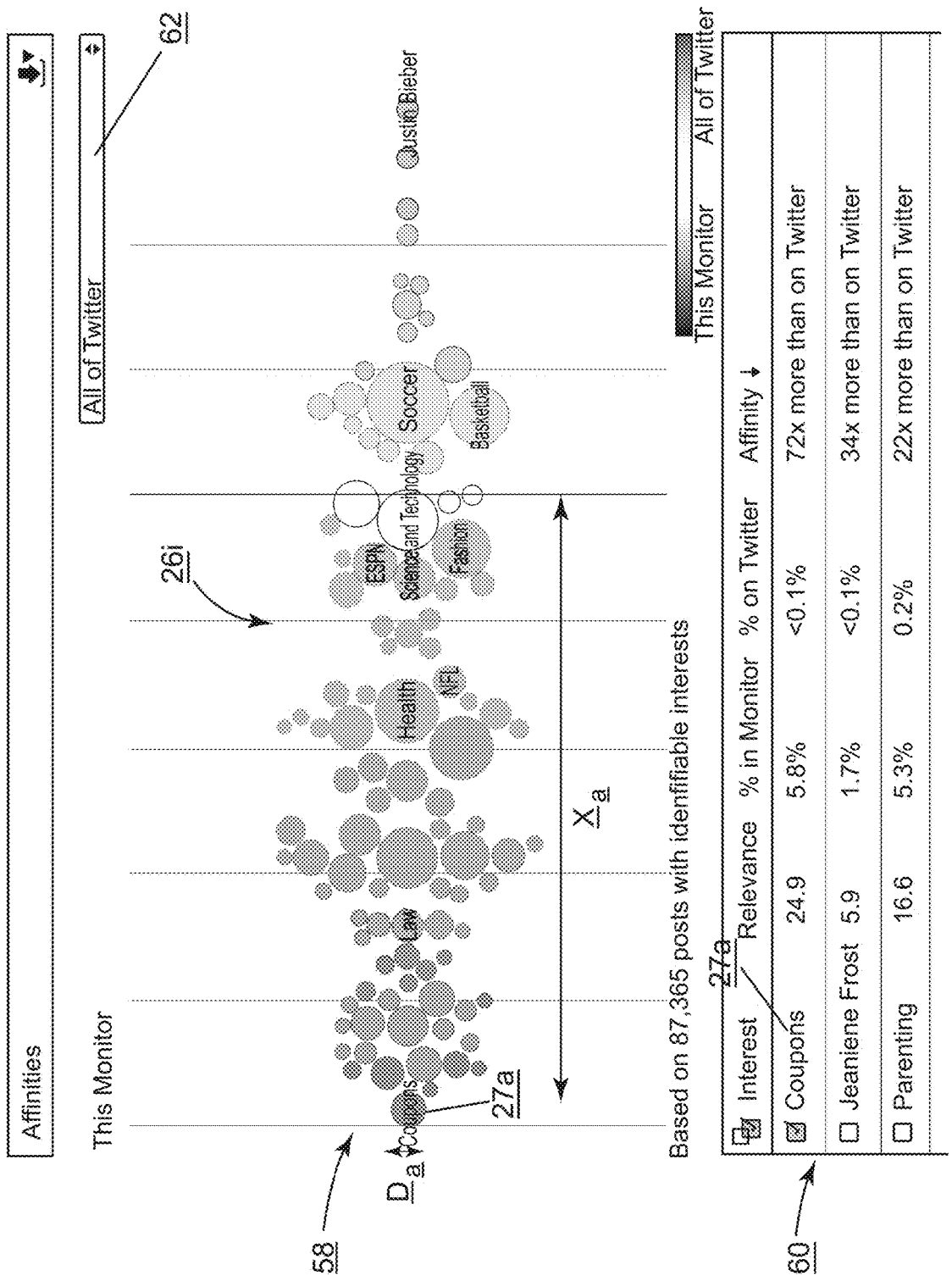

FIG. 8 provides an example of both graphical 58 and tabular 60 illustrations of the interest affinity data 26i. The graphical portion 58 illustrates the relevant interest topics on a horizontal axis, with the first group $G_1$ on the left and the second group $G_2$ on the right. For illustration purposes, the first group $G_1$ has been defined as individuals who have created social media content on a particular subject and is referred to as "this monitor." The second group $G_2$ has been defined as all users on TWITTER.

Each topic is represented as a bubble whose size is proportionate to the total number of people in both groups who are interested in that topic. Thus, for example, the diameter $D_a$ of the exemplary topic 27a correlates with the number of people in both the first group $G_1$ and the second group $G_2$ who are interested in the topic 27a. Topics much more prevalent in the first group $G_1$ are drawn towards the left, and vice versa. Topics that are more or less equally common in the two groups $G_1$, $G_2$ are located near the center, which is designated by a vertical black line. Similarly, the color of each bubble is indicative of the relative prevalence of that interest topic in one group versus the other. Thus, for example, a distance $X_a$ of an exemplary topic 27a from the center line is proportional to the relative interest of people in "this monitor" compared to everyone on TWITTER. Also, the dark green color of the bubble indicates that the topic 27a is much more likely to be of interest to people in "this monitor" than to the general population on TWITTER.

At least some of the interest topics included in the interest affinity data 26i can also be listed in tabular form in the tabular portion 60. The tabular portion 60 can include various measures of the listed topics' incidence in each of the first and second groups $G_1$, $G_2$. For example, in the illustrated embodiment, the tabular portion 60 lists four measures of the relative interest of people in "this monitor" compared to the interest of everyone on TWITTER: "relevance" of the topic, percent of people in "this monitor" who are interested in the topic, percent of people on "all of TWITTER" who are interested in the topic, and "affinity" of the topic. Both "relevance" and "affinity" are measures of the relative prevalence of an interest topic in one group versus the other. For example, "affinity" refers to the ratio of people in the first group $G_1$ who are interested in a topic to the people in the second group $G_2$, e.g., 72 times more people on "this monitor" are interested in coupons than people on all of TWITTER. Similarly, a high "relevance" score indicates that a topic that is much more likely to be of interest one group as opposed to the other group, and vice versa.

Figure 9:
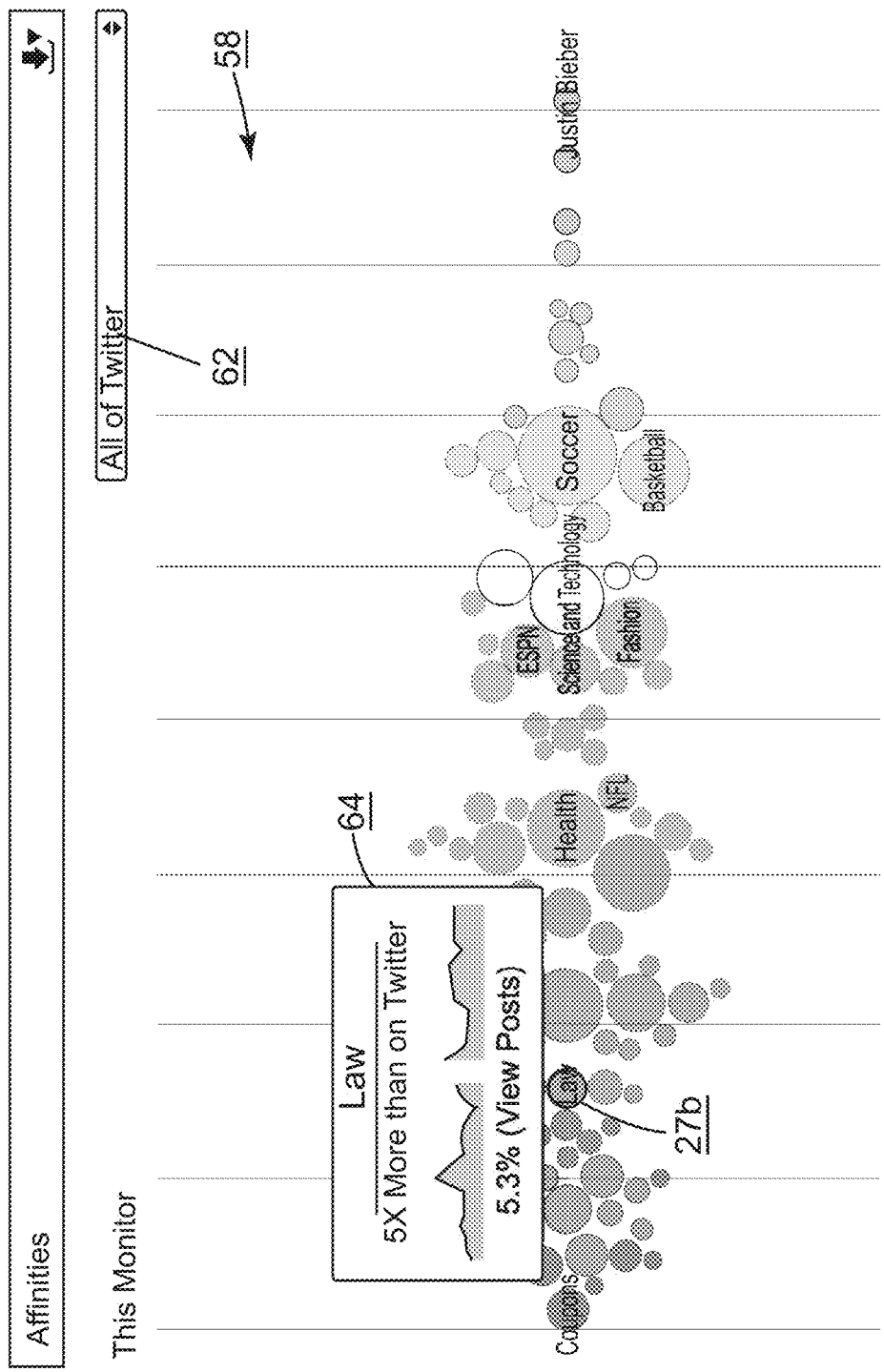
FIG. 9 is a diagram of another exemplary display output from the systems and methods of the invention.

In addition, the display module 28 can provide interaction. For example, a user can change the second group $G_2$ to a pre-defined group, e.g., all users on FACEBOOK, all male users, etc., by clicking on a drop-down menu 62. New interest affinity data 26i that compares the first group $G_1$ with the new second group $G_2$ can then be displayed in place of the previous interest affinity data 26i. In some embodiments, clicking on a bubble in the graphical portion 58 and/or checking a checkbox next to a topic in the tabular portion 60 could cause the display module 28 to display available statistics and metrics regarding the group of people who are interested in that topic. In general, the statistics and metrics can be derived from the content affinity data 26c. For example, as shown in FIG. 9, clicking on a bubble for exemplary topic 27b, "law," can cause the display module 28 to display a pop-up 64 that illustrates the affinity of the law topic, the percent of people on "this monitor" who are interested in law, and a graph demonstrating the number of posts on law over time. In addition, by clicking on "view posts," the user can be presented with the option of viewing exemplary social media content that has a high prevalence among the group of people who are interested in the topic 27b, as determined by the affinity module 24 according to the second exemplary method illustrated in FIG. 7.

Figure 10:
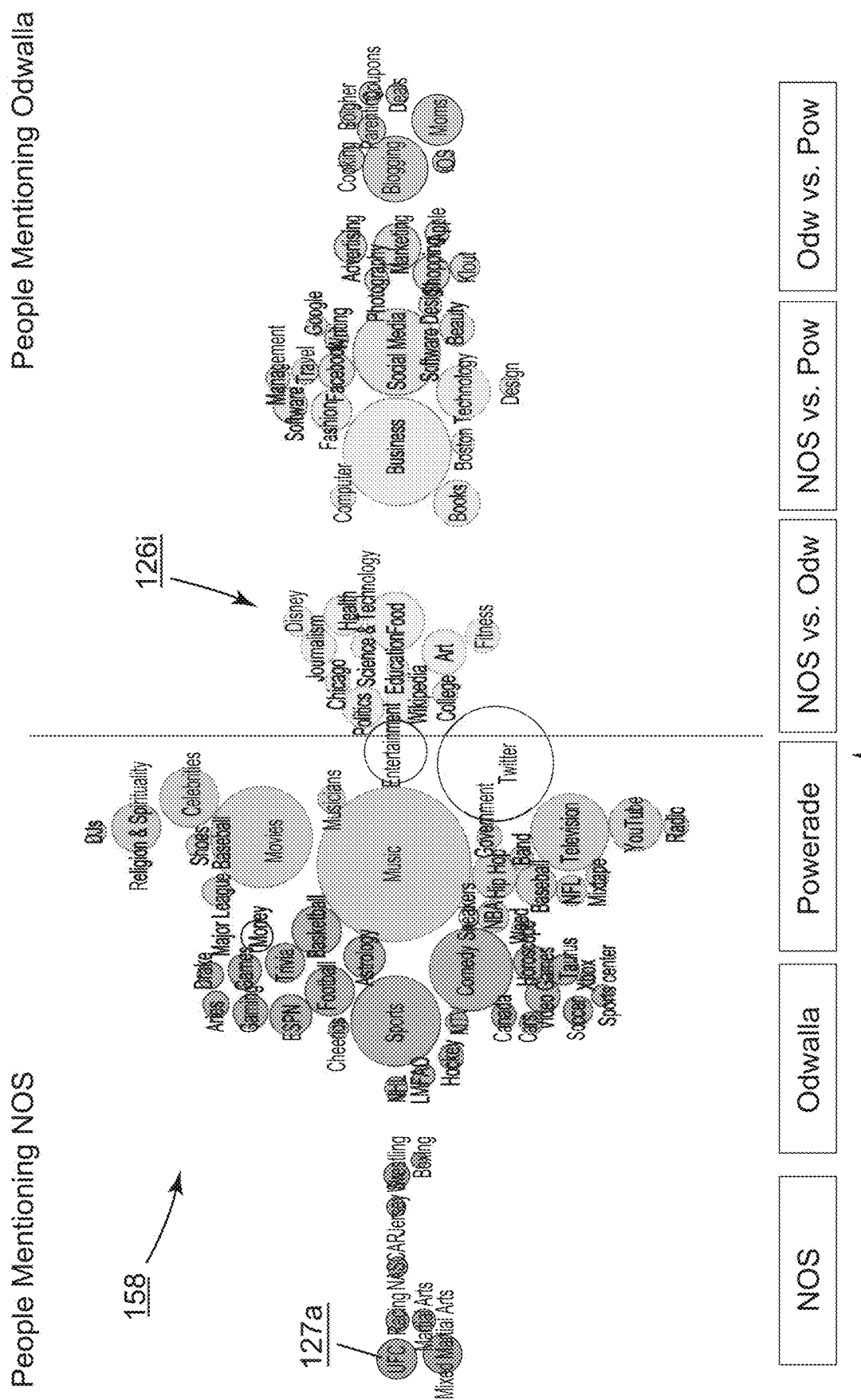
FIG. 10 is a diagram of another exemplary display output from the systems and methods of the invention.

A second exemplary embodiment of a graphical display 158 of interest affinity data 126i is illustrated in FIG. 10. Rather than comparing a particular group against the general population, as in the embodiment of FIGS. 8-9, this graph illustrates a comparison of two groups who have different interests—specifically, interests in different health foods. A first group $G_{a1}$ includes people who have created social media content relating to "NOS" and a second group $G_{a2}$ includes people who have created social media content relating to "ODWALLA." Similar to the embodiment of FIGS. 8-9, here each topic is represented by a bubble whose size represents the number of people who are interested in the topic and whose color and distance along a horizontal axis represents a relative prevalence of that topic in one group versus the other.

Also like the embodiment of FIGS. 8-9, in this embodiment the display module 28 can provide for user interaction. For example, by clicking on any of the buttons 166, the user can change the identity of one or both groups, thereby causing the display module 28 to display interest affinity data 26i for a different set of groups. Clicking on a bubble, e.g., on a bubble for an exemplary topic 127a, "UFC," can bring up available statistics and metrics regarding a group of people who are interested in that topic. Here, clicking on a topic causes the display module 28 to bring up a separate screen that displays more details about the topic, which can be derived from the interest data 16, the affinity data and/or the filtered social media data 22.

Figure 11:
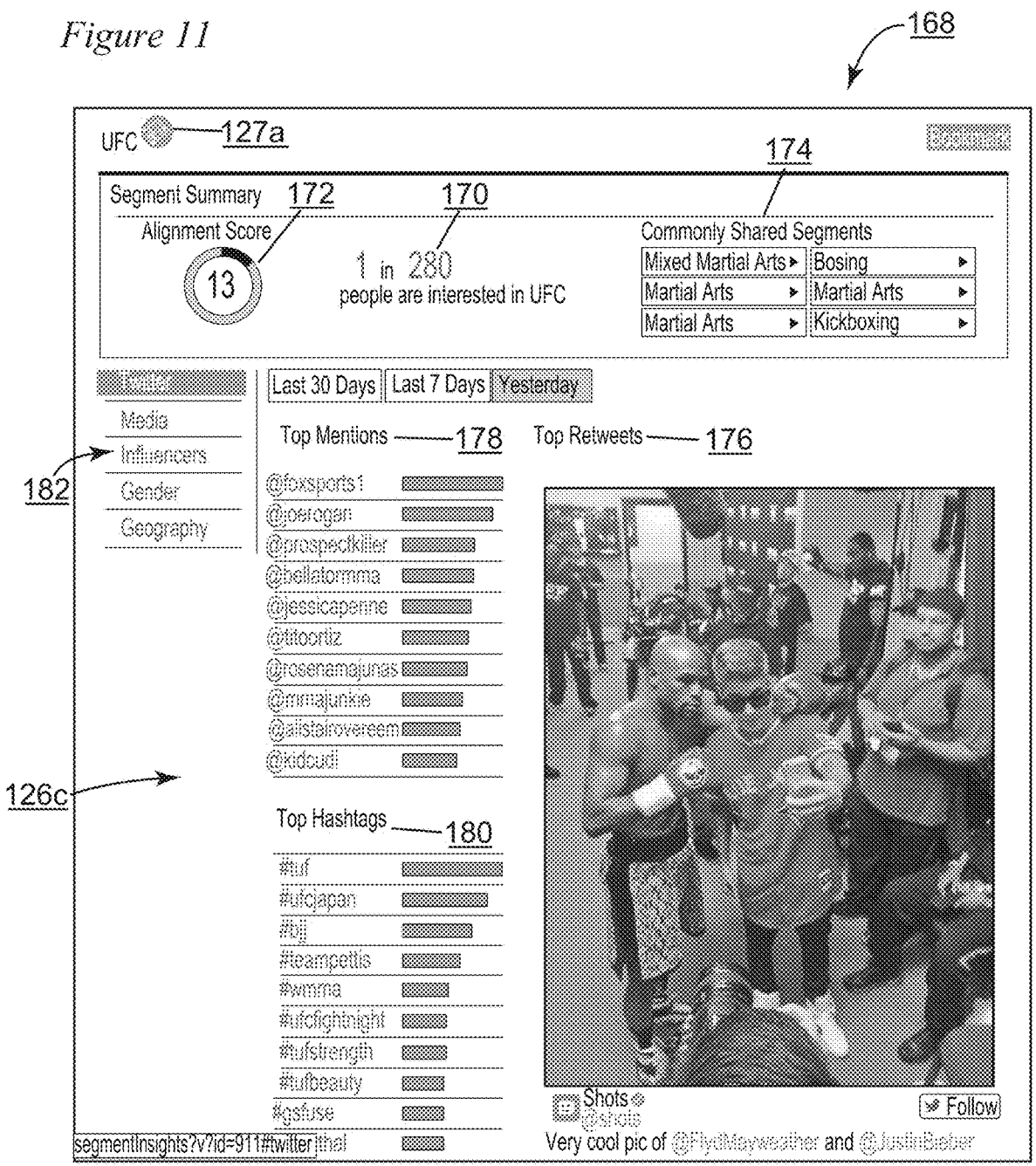
FIG. 11 is a diagram of another exemplary display output from the systems and methods of the invention.

FIG. 11 illustrates an exemplary screen 168 that can be brought up when a user clicks on the "UFC" topic bubble in FIG. 10 and that displays the content affinity data 26c for the group of people interested in UFC (referred to on the screen 168 as a "segment"). In the illustrated embodiment, the screen 168 displays the number of people out of a general population who are interested in the UFC 170, an alignment score 172, and commonly shared segments (or interests) 174 among people in the UFC segment. The alignment score 172 is a measure of the homogeneity of the UFC segment. Where people within the segment tend to post similar content, e.g., the same videos, retweets, etc., the alignment score 172 will be high, and where people within the segment tend to post unrelated content, the score 172 will be low. Commonly shared interests 174 can be derived from the interest data 16 and/or from the filtered social media data 22. Notably, the commonly shared interests 174 are not just the most common interests of the UFC segment, but rather interests that are common in the UFC segment relative to their prevalence in the general community and/or other segments.

The screen 168 can also display documents and other data related to the UFC that have hallmarks of being popular, such as tweets with the largest number of "re-tweets" 176, people or places who are often mentioned along with the UFC ("top mentions" 178), and hashtags that are used along with the UFC ("top hashtags" 180). Like the commonly shared interests 174, these documents and related data are displayed due to their relative prevalence within the UFC segment as determined by the affinity module 24. It will be appreciated that the screen 168 and the metrics provided thereon are only one exemplary embodiment of more detailed information that could be provided on a given interest topic.

The screen 168 can have user interactive components. For example, clicking on any of the buttons 182 can allow the user to view similar data based on different criteria, e.g., clicking on the "gender" button can display similar data to that shown on the screen 168, but broken down by gender. Clicking on the "last 7 days" button can cause the display module 28 only to display relevant information from the past 7 days. Also, in the exemplary embodiment of FIG. 11, the user can click on any of the commonly shared interests 174 to get to a display similar to the display 168 for the commonly shared interest topics.

A person of ordinary skill in the art will appreciate further features and advantages of the invention based on the above-described embodiments and objectives. Accordingly, the invention is not to be limited by what has been particularly shown and described, except as indicated by the appended claims or those ultimately provided. All publications and references cited herein are expressly incorporated herein by reference in their entirety, and the invention expressly includes all combinations and sub-combinations of features included above and in the incorporated references.

What is claimed is:

1. A computer-implemented method comprising operating at least one computer processor to analyze information communicated through social media platforms and provide an interactive user interface allowing a user to display affinity data for a selected topic, the method comprising:
   for each person in a plurality of people, generating and storing in a data store respective influence data and interest data,
   wherein the influence data includes information indicating relationships between the person and influencers of the person within a social media network of the person,
   wherein the interest data includes content topics of interest to the person, the content topics of interest being identified based on one or more of:
   (a) social media data created by the person;
   (b) social media data created by the influencers of the person in the social media network of the person; and
   (c) probabilistic estimated data based on demographics of the person;
   for each of the content topics of interest of each of the persons in the plurality of people, calculating a respective combined weight and assigning, in the data store, the each of the calculated combined weights to the respective content topic, the combined weights of the each of the content topics of interest being calculated by:
   (i) retrieving, from the data store, the interest data and the influence data;
   (ii) calculating a first weight for each of the content topics that is associated with the person;
   (iii) calculating a second weight for each of the content topics that is associated with individuals, from among the influencers, who influence the person;
   (iv) calculating a third weight for each content topic that is associated with individuals, from among the influencers, who are influenced by the person; and
   (v) combining the respective first weight, second weight, and third weight for each of the content topics to obtain the respective combined weight;
   obtaining a first plurality of data items communicated through at least one social media platform related to a first criterion, the data items in the first plurality each authored by one of the plurality of people;
   obtaining a second plurality of data items communicated through at least one social media platform related to a second criterion, the data items in the second plurality each authored by one of the plurality of people;
   comparing, based on the respective combined weights, the content topics of interest of the people who are authors of the data items in the first plurality of data items to the content topics of interest of the people who are authors of the data items in the second plurality of data items, to determine content topics that are substantially not in common as between the authors of the data items in the first plurality of data items and the authors of the data items in the second plurality of data items; and
   displaying on a computer display a representation of the first criterion, the second criterion, and a representation of the content topics of interest that are substantially not in common;
   wherein the representation comprises a graph having a plurality of bubbles, each of the bubbles representing one of the content topics that is substantially not in common as between the authors of the data items in the first plurality of data items and the authors of the data items in the second plurality of data items;
   wherein a location of each of the bubbles along an axis of the representation reflects a relative prevalence of the content topic to which the bubble corresponds among authors of the data items in the first plurality of data items compared to the authors of the data items in the second plurality of data items; and
   wherein user interaction with the representation of content topics generates a further display of content affinity data for a selected content topic.

2. The computer-implemented method of claim 1, wherein a size of each of the bubbles reflects a number of people interested in the content topic to which the bubble corresponds.

3. The computer-implemented method of claim 1, wherein the identifying of the content topics of interest further comprises selecting content topics having a weight above a threshold value and storing only the selected content topics.

4. A computer system providing an interactive user interface allowing a user to display affinity data for a selected topic, comprising:
   a memory storing computer-executable instructions and a data store;
   at least one processor communicatively coupled to the memory and configured to execute the computer-executable instructions to perform a method of analyzing information communicated through social media platforms, the method comprising:
   for each person in a plurality of people, generating and storing in the data store respective influence data and interest data, wherein the influence data includes information indicating relationships between the person and influencers of the person within a social media network of the person, wherein the interest data includes content topics of interest to the person, the content topics of interest being identified based on one or more of:

(a) social media data created by the person;
(b) social media data created by the influencers of the person in the social media network of the person; and
(c) probabilistic estimated data based on demographics of the person;

for each of the content topics of interest of each of the person in the plurality of people, calculating respective combined weigh and assigning, in the data store, the each of the calculated combined weights to the respective content topic, the combined weights of the each of the content topics of interest being calculated by:

(i) retrieving, from the data store, the interest data and the influence data;
(ii) calculating a first weight for each of the content topics that is associated with the person;
(iii) calculating a second weight for each of the content topics that is associated with individuals, from among the influencers, who influence the person;
(iv) calculating a third weight for each content topic that is associated with individuals, from among the influencers, who are influenced by the person; and
(v) combining the respective first weight, second weight, and third weight for each of the content topics to obtain the respective combined weight;

obtaining content topics from the data store for first and second groups of people and comparing, based on the respective combined weights, the content topics of people in the first group with the content topics of people in the second group to determine content topics that are substantially not in common as between people in the first and second groups; and displaying on a computer display a representation of the content topics that are substantially not in common;

wherein the representation of the content topics that are substantially not in common comprises a graph having a plurality of bubbles, each of the bubbles representing a content topic that is substantially not in common as between the first and second groups;

wherein a location of each of the bubbles along an axis of the representation reflects a relative prevalence of the content topic to which the bubble corresponds in the first group versus the second group; and wherein user interaction with the representation of content topics generates a further display of content affinity data for a selected content topic.

5. The computer system of claim 4, wherein the first group comprises authors of a first plurality of data items communicated through at least one social media platform that are related to a first criterion and the second group comprises authors of a second plurality of data items communicated through at least one social media platform that are related to a second criterion.

6. The computer system of claim 4, wherein a size of each of the bubbles reflects a number of people interested in the content topic to which the bubble corresponds.

* * * * *